(12) United States Patent
Rockefeller et al.

(10) Patent No.: US 9,587,672 B1
(45) Date of Patent: Mar. 7, 2017

(54) ADJUSTABLE OFFSET PIVOT JOURNAL PAD

(71) Applicant: Lufkin Industries, LLC, Lufkin, TX (US)

(72) Inventors: Donald Rockefeller, Wellsville, NY (US); Joseph Hart, Wellsville, NY (US)

(73) Assignee: Lufkin Industries, LLC, Lufkin, TX (US)

( * ) Notice: Subject to any disclaimer, the term of this patent is extended or adjusted under 35 U.S.C. 154(b) by 15 days.

(21) Appl. No.: 14/822,988

(22) Filed: Aug. 11, 2015

(51) Int. Cl.
*F16C 17/03* (2006.01)
*F16C 25/02* (2006.01)
*B23P 15/00* (2006.01)

(52) U.S. Cl.
CPC ........... *F16C 25/02* (2013.01); *B23P 15/003* (2013.01); *F16C 17/03* (2013.01)

(58) Field of Classification Search
CPC ......... F16C 17/03; F16C 25/02; B23P 15/003
See application file for complete search history.

(56) References Cited

U.S. PATENT DOCUMENTS

| | | | |
|---|---|---|---|
| 1,940,301 A | 12/1933 | Grobel et al. | |
| 2,348,928 A | 5/1944 | Sampatacos | |
| 2,507,021 A | 5/1950 | Lakey | |
| 2,950,002 A | 8/1960 | Eastburg | |
| 3,021,182 A | 2/1962 | Schnacke | |
| 3,378,319 A | 4/1968 | Cutting et al. | |
| 3,454,312 A | 7/1969 | Bielec | |
| 3,502,375 A | 3/1970 | Whittum | |
| 3,515,449 A | 6/1970 | Harbage | |
| 3,610,711 A * | 10/1971 | Mierley, Sr. | F16C 33/74 277/422 |
| 3,687,510 A | 8/1972 | Cooper | |
| 3,708,216 A * | 1/1973 | Gerling | F16C 25/02 384/312 |
| 3,893,737 A | 7/1975 | Tyson | |
| 3,941,434 A | 3/1976 | Schurger | |
| 3,982,796 A | 9/1976 | Hill | |
| 4,025,133 A * | 5/1977 | Cornford | F16C 17/06 384/310 |

(Continued)

FOREIGN PATENT DOCUMENTS

| | | |
|---|---|---|
| EP | 1334282 | 8/2003 |
| GB | 671769 | 5/1952 |
| JP | 56-76724 | 6/1981 |

OTHER PUBLICATIONS

Timken, "AP Bearings for Industrial Applications", Timken catalog, copyright 2008 by Timken, [retrieved from the Internet on Oct. 22, 2014 using <URL: http://www.timken.com/EN-US/products/Documents/Timken-AP-Bearing-Catalog.pdf>].

(Continued)

*Primary Examiner* — Thomas R. Hannon
(74) *Attorney, Agent, or Firm* — Crowe & Dunlevy, P.C.

(57) ABSTRACT

Improved bearing systems and methods for adjusting pivot offsets of bearing systems. The improved bearing systems and methods provide offset pivot adjustability. When an adjustable offset pad insert is installed one way, one pivot offset is set. The pivot offset may be adjusted and set another way by removing the adjustable offset pad insert, rotating it 180 degrees and installing the adjustable offset pad insert back in the journal pad.

20 Claims, 7 Drawing Sheets

(56) References Cited

U.S. PATENT DOCUMENTS

| | | | | |
|---|---|---|---|---|
| 4,039,228 | A | * | 8/1977 | Repose .................. F16C 23/04 |
| | | | | 384/312 |
| 4,247,157 | A | * | 1/1981 | Sigg ..................... F01D 25/166 |
| | | | | 384/307 |
| 4,291,926 | A | | 9/1981 | Tomioka et al. |
| 4,302,060 | A | | 11/1981 | Nicholas et al. |
| 4,335,925 | A | | 6/1982 | Stopp |
| 4,456,391 | A | | 6/1984 | New |
| 4,474,483 | A | | 10/1984 | Suzuki |
| 4,497,587 | A | | 2/1985 | Pine |
| 4,501,505 | A | | 2/1985 | Chambers |
| 4,566,204 | A | | 1/1986 | Friesner |
| 4,568,204 | A | | 2/1986 | Chambers |
| 4,699,524 | A | | 10/1987 | Bath |
| 4,714,357 | A | * | 12/1987 | Groth ..................... F16C 17/03 |
| | | | | 384/312 |
| 5,211,484 | A | | 5/1993 | Quaglia |
| 5,288,153 | A | | 2/1994 | Gardner |
| 5,423,613 | A | | 6/1995 | Keck et al. |
| 5,433,528 | A | | 7/1995 | San Andres |
| 5,480,234 | A | | 1/1996 | Chen |
| 5,482,380 | A | | 1/1996 | Corratti et al. |
| 5,513,917 | A | | 5/1996 | Ide et al. |
| 5,515,458 | A | | 5/1996 | Ide et al. |
| 5,518,321 | A | | 5/1996 | Hata |
| 5,547,287 | A | | 8/1996 | Zeidan |
| 5,660,481 | A | | 8/1997 | Ide et al. |
| 5,702,186 | A | | 12/1997 | Hackstie et al. |
| 5,738,447 | A | | 4/1998 | Nicholas |
| 5,743,654 | A | | 4/1998 | Ide et al. |
| 5,879,085 | A | | 3/1999 | Ball et al. |
| 5,915,843 | A | | 6/1999 | Mattera |
| 5,951,172 | A | | 9/1999 | Byrne |
| 6,485,182 | B2 | | 11/2002 | Nicholas |
| 7,758,247 | B2 | * | 7/2010 | Geiger .................. F16C 17/03 |
| | | | | 384/309 |
| 8,992,088 | B2 | * | 3/2015 | Brahm ................... F16C 17/03 |
| | | | | 384/309 |
| 2002/0081044 | A1 | | 6/2002 | Shima |
| 2008/0056632 | A1 | | 3/2008 | Yoshimura et al. |
| 2014/0161381 | A1 | | 6/2014 | Buchanan et al. |
| 2014/0219592 | A1 | * | 8/2014 | Mathieu ................. F16C 17/03 |
| | | | | 384/257 |
| 2014/0254963 | A1 | | 9/2014 | Blair |
| 2014/0270607 | A1 | | 9/2014 | Livermore-Hardy et al. |

OTHER PUBLICATIONS

Vesselinov, V., International Search Report for International Application No. PCT/US2015/044699, European Patent Office, dated Dec. 10, 2015.

Vesselinov, V., Written Opinion for International Application No. PCT/US2015/044699, European Patent Office, dated Dec. 10, 2015.

Mehta, N.P. et al., "Stability of Finite Elliptical Pressure Dam Bearings with Rotor Flexibility Effects", ASLE Transactions, vol. 29, No. 4, pp. 548-557, Apr. 1981.

Nicholas, J.C. et al., "Analysis of Step Journal Bearings—Finite Length, Stability", ASLE Transactions, vol. 22, No. 2, pp. 197-207, Apr. 1980.

Nicholas, J., "Bearing Solutions for High-Speed Gearbox Applications", Gear Solutions, Jul. 2011.

Nicholas, J.C., "Stability, Load Capacity, Stiffness, and Damping Advantages of the Double Pocket Journal Bearing", ASME Journal of Tribology, Jan. 1985.

Nicholas, J.C. et al., "Theory and Application of Multipocket Bearings for Optimum Turborotor Stability", ASLE Transactions, vol. 24, No. 2, pp. 269-275, Apr. 1981.

Nicholas, J.C., "Stabilizing Turbomachinery with Pressure Dam Bearings", Encyclopedia of Fluid Mechanics, vol. 2, Gulf Publishing Company, Dec. 1994.

Moro, V., International Search Report for International Application No. PCT/US2015/029894, European Patent Office, dated Sep. 10, 2015.

Moro, V., Written Opinion for International Application No. PCT/US2015/029894, European Patent Office, dated Sep. 10, 2015.

* cited by examiner

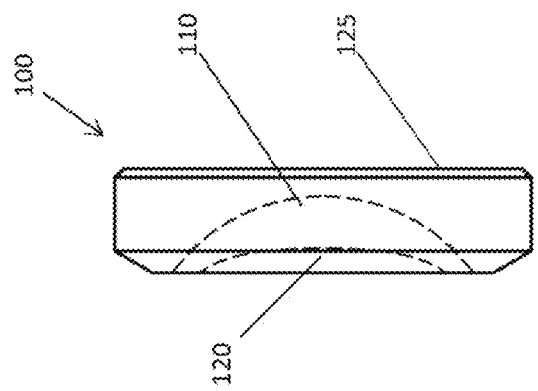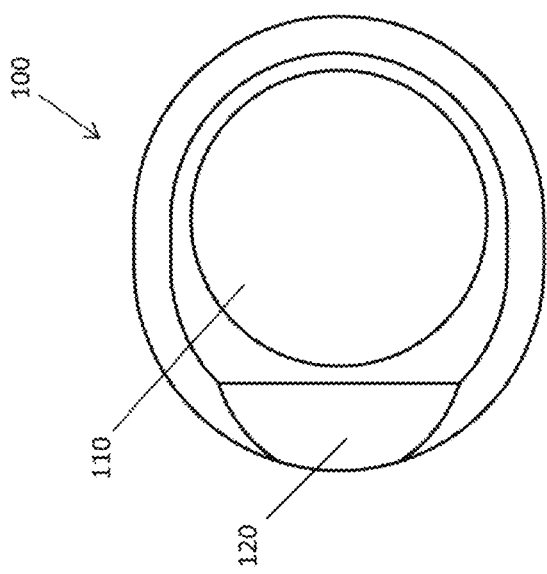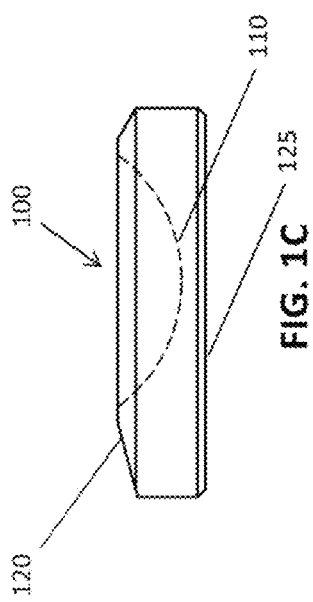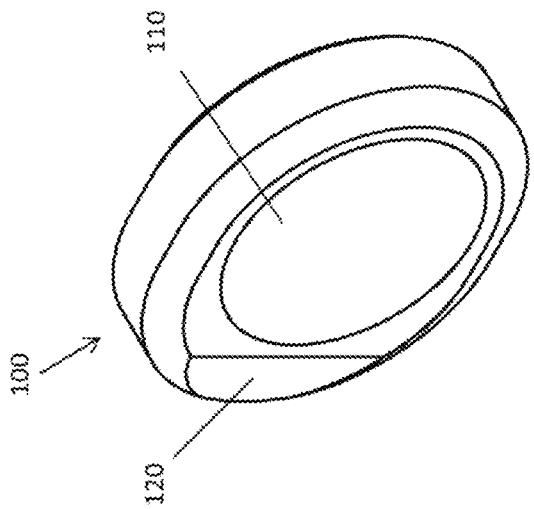

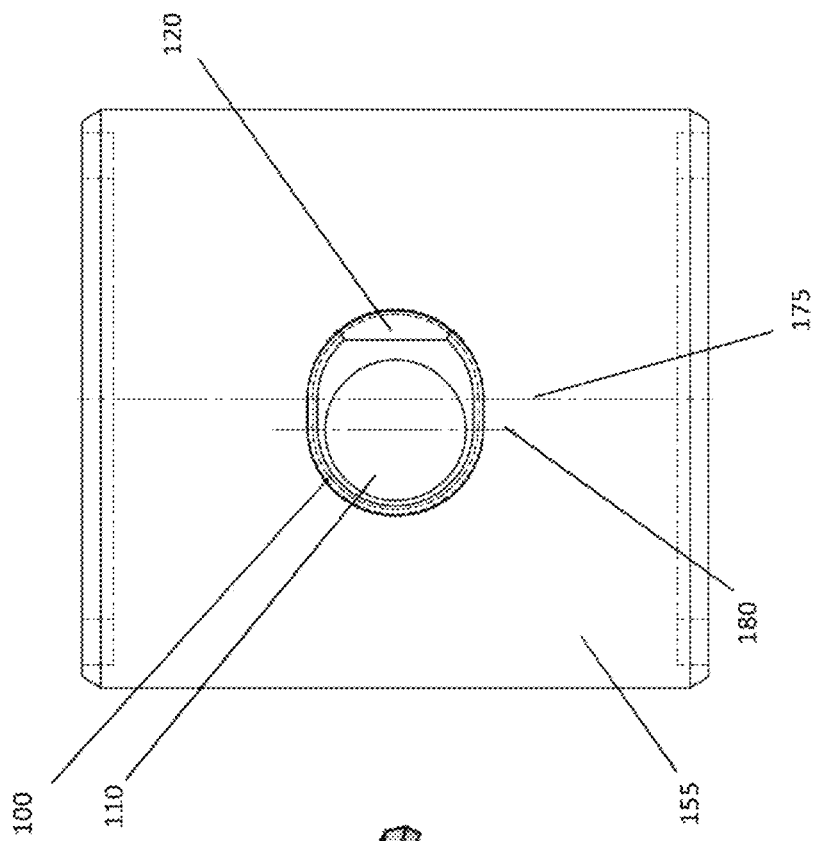
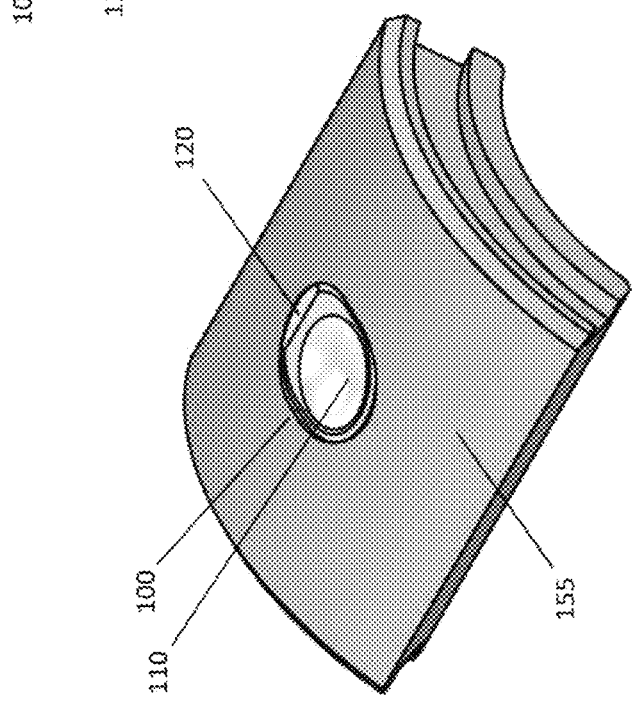
FIG. 2B
FIG. 2A

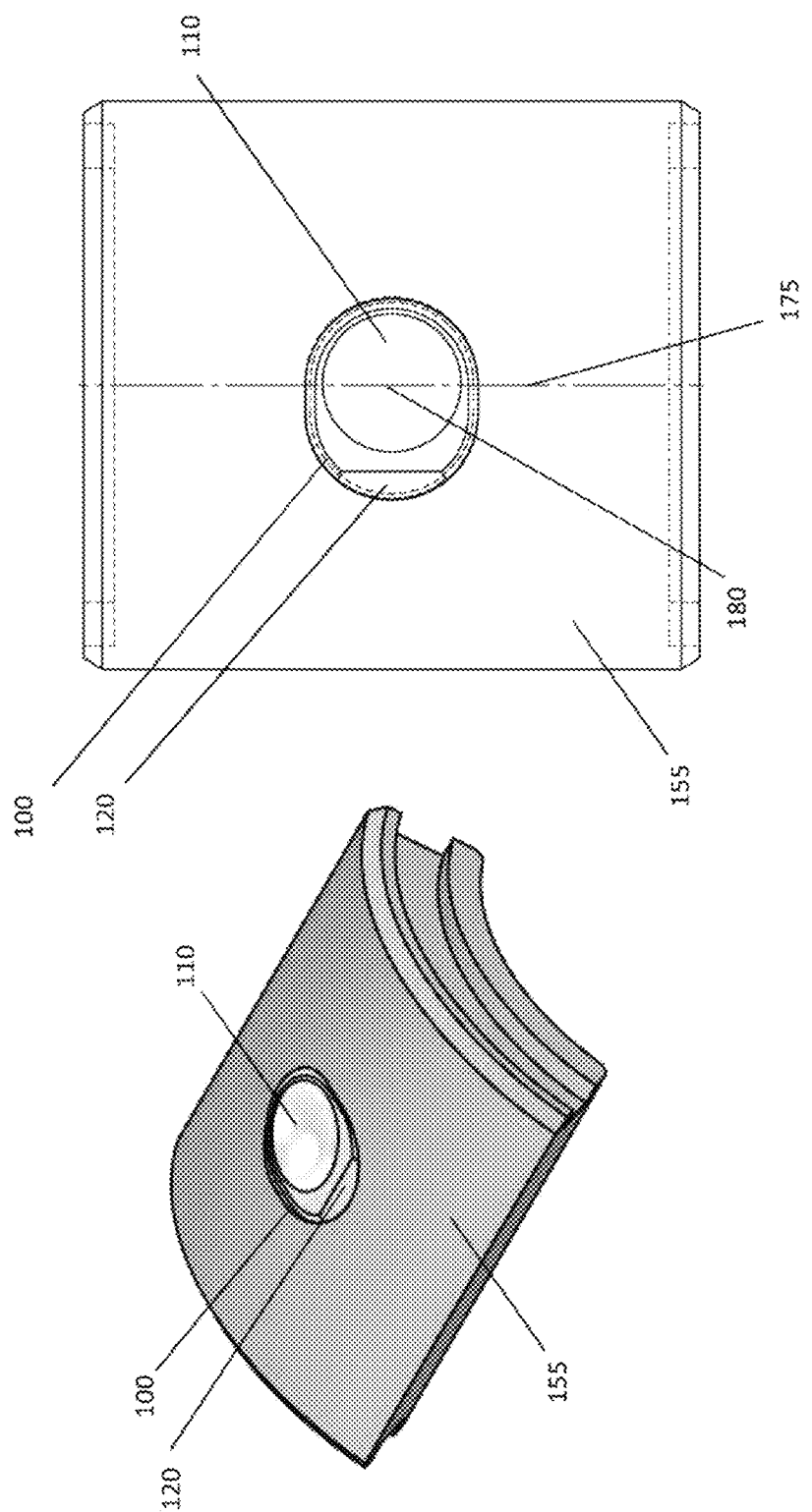

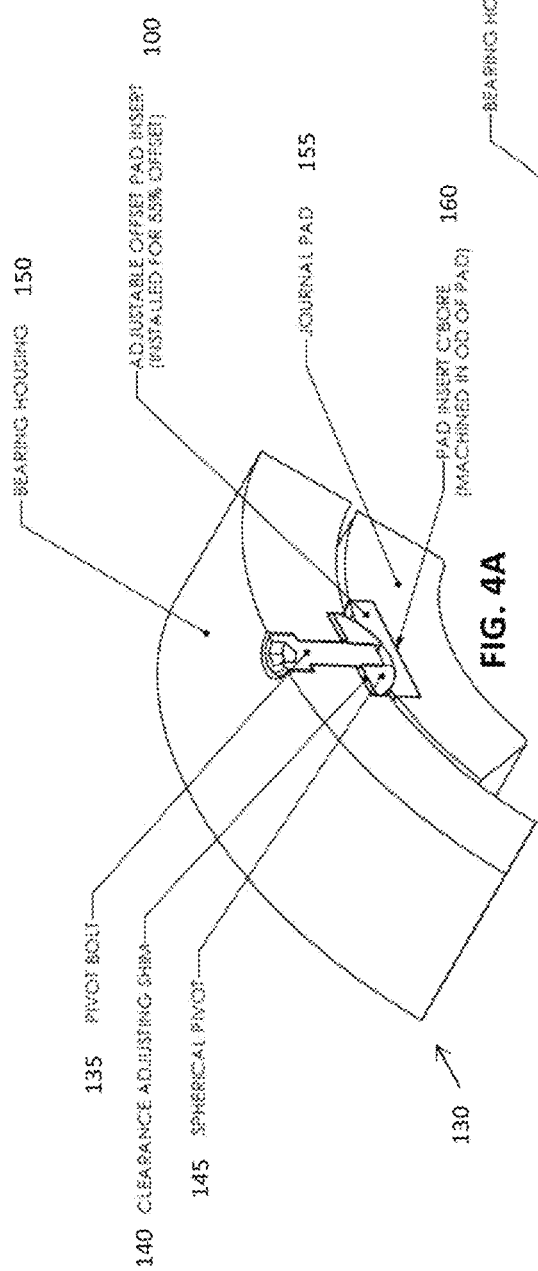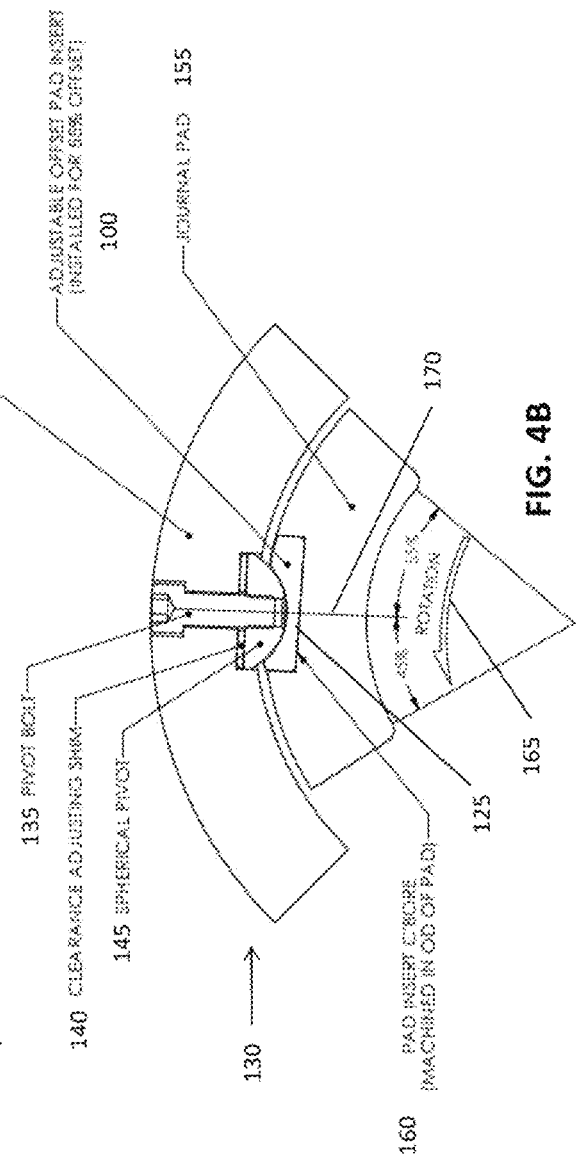

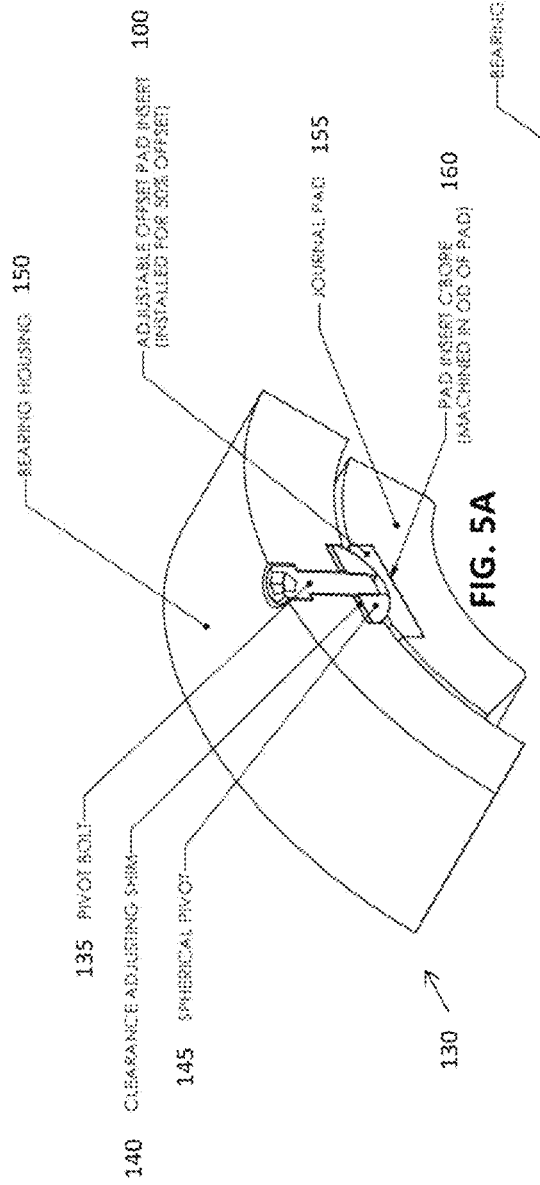
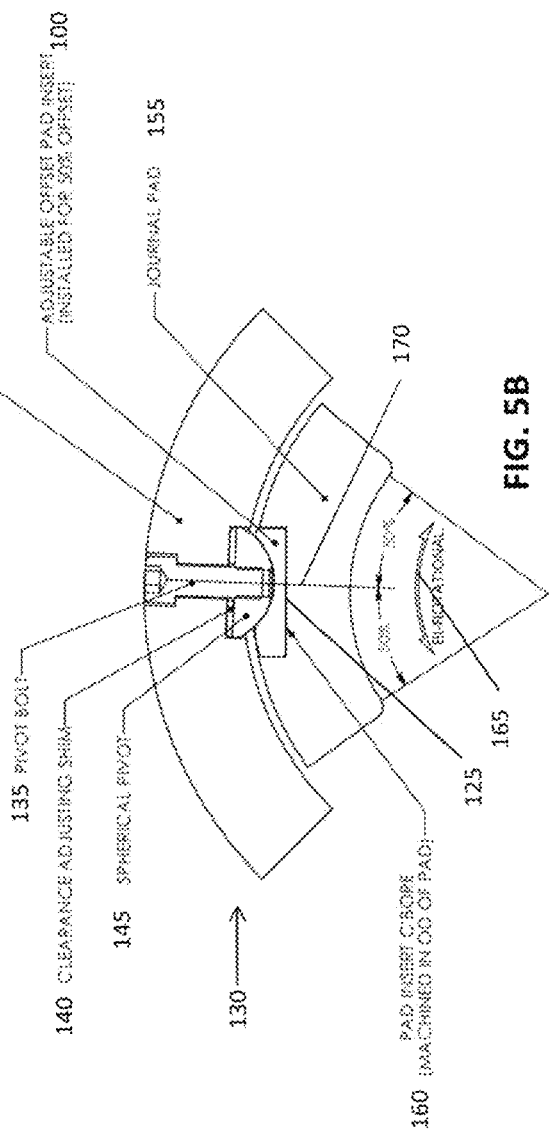
FIG. 5A
FIG. 5B

ADJUSTABLE OFFSET PIVOT JOURNAL PAD

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The inventions disclosed and taught herein relate generally to bearing systems and methods; and more specifically bearing systems and methods with adjustable offsets.

Description of the Related Art

A wide variety of rotating equipment utilizes one or more rolling assemblies to react loads as well as facilitate rotational motion. For example, centrifugal compressors may be considered rolling assemblies and use bearing systems to react the load of the centrifugal compressors and to facilitate rotational motion.

If a rotating machine, such as a centrifugal compressor, experiences rotor dynamic instability on the test stand or in operation, or varying bearing temperatures, currently the problem is addressed by replacing the journal pad with a different journal pad, each with a different pivot offset.

For example, when a machine, such as a centrifugal compressor, is tested it may have bearing temperature or stability issues that a change in the pad offset may solve. Typically, a user would have to purchase two separate sets of journal pads, for example, one with 50% pivot offset and another set with 55% pivot offset or machining the length to establish a new offset.

The inventions disclosed and taught herein are directed to improved bearing systems with adjustable pivot offsets and methods for adjusting pivot offsets.

BRIEF SUMMARY OF THE INVENTION

As one of many possible brief summaries of the nature and substance of the inventions claimed herein comprise an apparatus for adjusting the offset of a bearing assembly, wherein the length of the apparatus is greater than the width of the apparatus which is greater than the height of the apparatus, comprising: a substantially flat bottom surface, wherein the substantially flat bottom surface forms the length and width of the apparatus, a top surface, wherein the top surface is parallel to the substantially flat bottom surface; and a spherical seat formed in the top surface, wherein the spherical seat is substantially centered along an axis running the length of the apparatus and offset along an axis running the width of the apparatus.

The apparatus may further comprise a chamfer formed in the top surface, wherein the chamfer is substantially centered along the axis running the length of the apparatus, and the chamfer is formed in an edge of the top surface, wherein the edge is parallel to the axis running the width of the apparatus and is furthest from the spherical seat. The apparatus may further be adapted to be inserted into a pad of the bearing assembly in a first orientation and a second orientation, wherein the first orientation is 180 degrees from the second orientation. The apparatus may further be adapted to change the pivot offset of the bearing assembly from a 50% pivot offset to a 55% pivot offset. The apparatus may further be adapted to change the pivot offset of the bearing assembly from a 55% pivot offset to a 60% pivot offset. The apparatus may be made from bronze or steel.

As another of the many possible brief summaries of the nature and substance of the inventions claimed herein comprise a method for adjusting a bearing assembly, the bearing assembly having a plurality of pads and an adjustable offset pad insert mounted within one of the plurality of pads, the method comprising: dismounting the adjustable offset pad insert from the pad; rotating the adjustable offset pad insert 180 degrees from its initial position; and mounting the adjustable offset pad insert with the pad in an orientation that is 180 degrees from its initial pre-rotation position.

Further, the adjustable offset pad used in method may be oblong. Yet further, the adjustable offset pad insert used in the method may comprise a spherical seat formed in a top surface, wherein the spherical seat is substantially centered along an axis running a length of the adjustable offset pad insert and offset along an axis running a width of the adjustable offset pad insert, wherein the length is longer than the width. Still further, the adjustable offset pad used in the method may include a relief chamfer formed in the top surface, wherein the top surface is opposite to the surface mounted with the pad, wherein the chamfer is substantially centered along the axis running the length of the adjustable offset pad insert, and the relief chamfer is formed in an edge of the top surface, wherein the edge is parallel to the axis running the width of the adjustable offset pad insert and is furthest from the spherical seat. The method may further comprise adjusting the pivot offset. The method may include adjusting the pivot offset from 49-51% to a 54-56% pivot offset.

As yet another of the many possible brief summaries of the nature and substance of the inventions claimed herein comprise a bearing assembly for supporting a rotatable member, comprising: a bearing casing having an inner surface; a plurality of pads mounted to the inner surface of the bearing casing, wherein the plurality of pads each have a counterbore; an adjustable offset pad insert mounted with the counterbore of one of the plurality of pads, wherein the offset pad insert is oblong.

Further, the adjustable offset pad insert of the bearing assembly may comprise a spherical seat formed in a top surface opposite to the surface mounted with the counterbore, wherein the spherical seat is substantially centered along an axis running a length of the adjustable offset pad insert and offset along an axis running the width of the adjustable offset pad insert. Yet further, the adjustable offset pad insert of the bearing assembly may include a chamfer formed in the top surface of the adjustable offset pad insert, wherein the top surface is opposite to the surface mounted with the counterbore, wherein the chamfer is substantially centered along an axis running a length of the adjustable offset pad insert and the chamfer is formed in an edge of the top surface, wherein the edge is parallel to the axis running the width of the adjustable offset pad insert and is furthest from the spherical seat. Additionally, the adjustable offset pad insert of the bearing assembly may be adapted to change the pivot offset of the bearing assembly. Moreover, the adjustable offset pad insert of the bearing assembly may be adapted to change the pivot offset of the bearing assembly from a 50% pivot offset to a 55% pivot offset. Further, the bearing assembly may comprise a journal bearing. The adjustable offset pad insert of the bearing assembly may is made from bronze or steel.

None of these brief summaries of the inventions is intended to limit or otherwise affect the scope of the appended claims, and nothing stated in this Brief Summary of the Invention is intended as a definition of a claim term or phrase or as a disavowal or disclaimer of claim scope.

BRIEF DESCRIPTION OF THE SEVERAL VIEWS OF THE DRAWINGS

The following figures form part of the present specification and are included to further demonstrate certain aspects of the present invention. The invention may be better understood by reference to one or more of these figures in combination with the detailed description of specific embodiments presented herein.

FIG. 1A illustrates a perspective view of one of many possible embodiments of an adjustable offset pad insert in accordance with certain teachings of the present disclosure.

FIG. 1B illustrates a top view of the embodiment illustrated in FIG. 1A.

FIG. 1C illustrates a side view of the embodiment illustrated in FIG. 1A.

FIG. 1D illustrates yet another side view of the embodiment illustrated in FIG. 1A.

FIG. 2A illustrates a perspective view of one of many possible embodiments of an adjustable offset pad insert installed into a journal pad with a 55% offset in accordance with certain teachings of the present disclosure.

FIG. 2B illustrates a top view of the embodiment illustrated in FIG. 2A.

FIG. 3A illustrates a perspective view of one of many possible embodiments of an adjustable offset pad insert in a journal pad with a 50% offset in accordance with certain teachings of the present disclosure.

FIG. 3B illustrates a top view of the embodiment illustrated in FIG. 3A.

FIG. 4A illustrates a sectional perspective view of one of many possible embodiments of an adjustable offset pad insert in a journal bearing with a 55% offset in accordance with certain teachings of the present disclosure.

FIG. 4B illustrates a side view of the embodiment illustrated in FIG. 4A.

FIG. 5A illustrates a sectional perspective view of one of many possible embodiments of an adjustable offset pad insert in a journal bearing with a 50% offset in accordance with certain teachings of the present disclosure.

FIG. 5B illustrates a side view of the embodiment illustrated in FIG. 5A.

Figure 6:
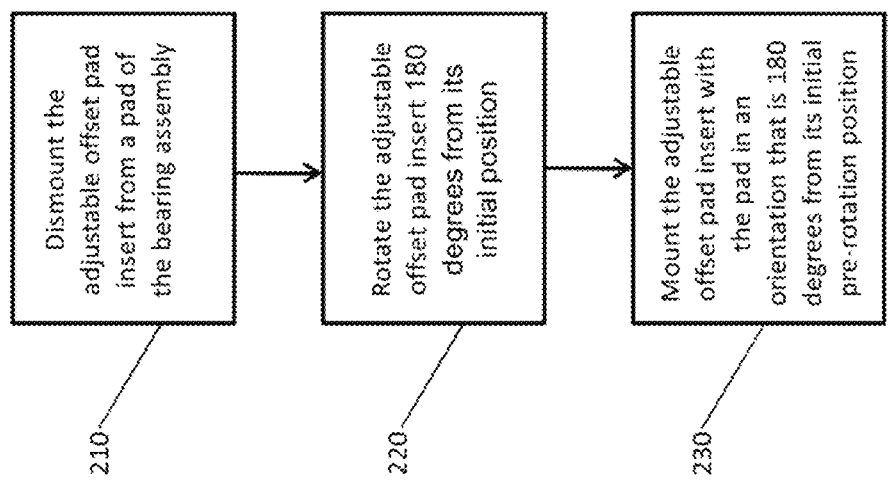
FIG. 6 is a block diagram illustrating one of many possible embodiments of a method for adjusting pivot offsets in accordance with certain teachings of the present disclosure.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Particular embodiments of the invention may be described below with reference to block diagrams and/or operational illustrations of methods. In some alternate implementations, the functions/actions/structures noted in the figures may occur out of the order noted in the block diagrams and/or operational illustrations. For example, two operations shown as occurring in succession, in fact, may be executed substantially concurrently or the operations may be executed in the reverse order, depending upon the functionality/acts/structure involved.

Applicants have created improved bearing systems and methods for adjusting pivot offsets, including more specifically, an adjustable offset pivot journal pad and an adjustable offset journal pad insert. The improved bearing systems and methods provide offset pivot adjustability. When an adjustable offset pad insert is installed one way, one pivot offset is set. The pivot offset may be adjusted or changed by removing the adjustable offset pad insert, rotating it typically 180 degrees, and installing the adjustable offset pad insert back in the journal pad. The pivot offset may be marked to aid in the installation of the proper offset. The improved bearing systems and methods may allow for changes in bearing temperature, stiffness and damping coefficients. The improved bearing systems and methods for adjusting pivot offsets may be used, for example, in the oil and gas, hydrocarbon, and other related industries.

Turning now to the figures, FIGS. 1A, 1B, 1C, and 1D is illustrate a perspective, top, and two side view of one of many possible embodiments of an adjustable offset pad insert in accordance with certain teachings of the present disclosure. FIG. 1B illustrates a top view of the embodiment illustrated in FIG. 1A. FIG. 1C illustrates a side view of the embodiment illustrated in FIG. 1A. FIG. 1D illustrates yet another side view of the embodiment illustrated in FIG. 1A.

Adjustable offset pad (or pivot) insert 100 as shown in FIGS. 1A, 1B. 1C, and 1D is spherically shaped with a bottom surface 125. In one embodiment, the bottom surface 125 is a substantially flat surface. On the top surface of the adjustable offset pad insert 100 is a seat 110. Seat 110 is located substantially centered along one axis of the top surface of the adjustable offset pad insert 100 and located offset the second axis of the top surface of the adjustable offset pad insert 100. The seat 110 is substantially spherical. Also on the top surface of the adjustable offset pad insert 100 is a chamfer 120. Chamfer 120 may be a relief chamfer. Chamfer 120 is located on the edge (of the top surface of the adjustable offset pad insert 100) that is furthest away from the seat 110.

Adjustable offset pad insert 100 may have many different embodiments while still allowing for an adjustable pivot offset. For example, the spherical seat 110 may be smaller or larger, may be oval shaped, or may be located at a different distance from the centerline to allow for the creation of different pivot offsets. As another example, the chamfer 120 may be smaller or larger, may be off center, or may have different shapes. The chamfer 120 may also be omitted in other embodiments. The body of the adjustable offset pad insert 100 may be of different shapes as long as the body may be rotated 180 degrees and still property mount with the pad as is shown in FIGS. 2A, 2B, 3A, 3B, 4A, 4B, 5A, and 5B.

The adjustable offset pad insert 100 may be used in a variety of bearing systems, including but not limited to a journal bearing.

Adjustable offset pad insert 100 allows for two pivot offsets options: 50% and 55%. It should be appreciated that other combinations of pivot offsets may be used. For example, 55% and 60% or 60% and 65% pivot offsets may be used. Any combination of pivot offsets that had been previously used with the prior two separate offset pad inserts method may be used for the adjustable offset pad insert disclosed herein.

The adjustable offset pad insert may be made from materials that journal pad inserts have been previously made with including for example, bronze or steel. The adjustable offset pad insert may be silver coated for sour gas applications where bare steel or bare insert material would react with the gas. There may be a situation where the adjustable offset pivot would need to be silver coated if the bearing was going into a sour gas application (H2N2). A silver coating may avoid a chemical reaction between the steel and the bronze insert material.

FIGS. 2A, 2B, 3A, 3B, 4A. 4B, 5A, and 5B illustrate multiple embodiments of an adjustable offset pad insert 100 in a journal pad 155 with FIGS. 4A, 4B, 5A, and 58B further showing the one of many possible embodiments of an adjustable offset pad insert 100 and journal pad 155 in a journal bearing assembly 130. While this disclosure is provided in the context of a journal pad, neither the applicability of this invention nor the claims sought to protect this invention are limited to a particular type of journal pad or even bearing.

FIGS. 2A, 2B, 3A, and 3B illustrate the adjustable offset pad insert 100 in a journal pad 155. FIGS. 2A and 2B illustrate a perspective and top view of one of many possible embodiments of an adjustable offset pad insert 100 installed into a journal pad 155 with a 55% offset in accordance with certain teachings of the present disclosure. FIGS. 3A and 3B illustrate a perspective and top view of one of many possible embodiments of an adjustable offset pad insert 100 installed into a journal pad 155 with a 50% offset in accordance with certain teachings of the present disclosure.

FIGS. 2A and 2B illustrate how when an adjustable offset pad insert 100 is installed one way, one pivot offset is set—in this case 55%. In FIG. 2B, the offset—in this case 55%—is shown between pad centerline 175 and spherical centerline 180. The pivot offset of the bearing may be adjusted or changed by removing the adjustable offset pad insert 100, rotating it 180 degrees and, as is shown in FIGS. 3A and 3B, installing the adjustable offset pad insert 100 back in the journal pad 155 creating a 50% offset. In FIG. 2B, the offset—in this case 50%—is shown in the overlap of pad centerline 175 and spherical centerline 180. These improved bearing systems and methods may allow for changes in bearing temperature, stiffness and damping coefficients.

The adjustable offset pad insert 100 may be mounted such that it is substantially flush with the top of the journal pad 155, may be mounted such that it is fully contained under the top surface of the journal pad 155, or may extend beyond the top surface of the journal pad 155. In alternative embodiments, the adjustable offset pad insert 100 may be mounted with the journal pad 155 by other means.

FIGS. 4A, 4B, 5A, and 5B illustrate one of many possible embodiments of an adjustable offset pad insert 100 and journal pad 155 in a journal bearing assembly 130. FIGS. 4A and 4B illustrate a sectional perspective and side view of one of many possible embodiments of an adjustable offset pad insert in a journal bearing with a 55% offset in accordance with certain teachings of the present disclosure. FIGS. 5A and 5B illustrate a sectional perspective and side view of one of many possible embodiments of an adjustable offset pad insert in a journal bearing with a 50% offset in accordance with certain teachings of the present disclosure.

As was described in FIGS. 2A, 2B, 2C, and 2D, adjustable offset pad insert 100 is mounted with journal pad 155. In the embodiment of FIGS. 4A, 4B, 5A, and 5B, the journal pad 155 includes a pad insert counterbore 160. Typically, the adjustable offset pad insert 100 is mounted or mated with the journal pad 155 by being placed or installed in the pad insert counterbore 160. Pivot 145 (shown here as spherical, but other shapes may be used) is placed in contact with or mounted to the adjustable offset pad insert 100. The point of contact between the pivot 145 and adjustable offset pad insert 100 is seat 110. Pivot 145 and seat 110 mate to make the connection between the journal pad 155 and bearing house 150. Pivot 150 is typically made of steel but may be made from other suitable materials. The pivot bolt 135 is typically used to align and connect the bearing housing 150 to the pivot. The pivot bolt 135 is typically a spherical bolt. The clearance adjusting shim 140 is a strip of material that may be used to align, make a proper fit, or provide clearance between the pivot 145 and bearing housing 150. The clearance adjusting shim 140 may also help to reduce wear.

FIGS. 4A and 4B illustrate an adjustable offset pad insert 100 installed in a way to allow a rotation 165 in a counterclockwise manner. The adjustable offset pad insert 100 is installed to cause the journal pad 155 to be offset to the right in FIGS. 4A and 4B. In FIGS. 4A and 4B, the offset is 50% to the left of offset axis 170 and 50% to the right of offset axis 170. Other embodiments such as 40% to the left of offset axis 170 and 60% to the right of offset axis 170 are also possible. Any combination of offset percentages is possible as long as the percentage is not less than 50%.

FIGS. 5A and 5B illustrate an adjustable offset pad insert 100 installed in a way to allow a rotation 165 in a bi-directional manner. The adjustable offset pad insert 100 is installed to cause the journal pad 155 to be offset to the right in FIGS. 5A and 5B. In FIGS. 5A and 5B, the offset is 50% to the left of offset axis 170 and 50% to the right of offset axis 170.

Other offsets, angles and rotations may be achieved by changing the location of the seat 110 in the adjustable offset pad insert 100. Each embodiment of the adjustable offset pad insert 100 offers two different offsets and thus allows for changes in angles, rotations, and bearing temperature, stiffness and damping coefficients. The pad arc length may also be changed.

FIG. 6 is a block diagram illustrating one of many possible embodiments of a method for adjusting pivot offsets in accordance with certain teachings of the present disclosure. The improved bearing methods provide offset pivot adjustability. When an adjustable offset pad insert is installed one way, one pivot offset is set. An improved bearing method for offset pivot adjustability is shown in FIG. 6. The method illustrates how to adjust the offset of a bearing by dismounting, rotating and remounting the adjustable pad insert. In step 210, the adjustable offset pad insert is dismounted or removed from a pad of the bearing assembly. In step 220, adjustable offset pad insert is rotated 180 degrees from its initial positions and mounted with the pad in an orientation that is 180 degrees from its initial pre-rotation position. The improved bearing methods may allow for changes in bearing temperature, stiffness and damping coefficients. Alternatively, multiple adjustable offset pad inserts may be changed on a single bearing system to further adjust the offset which may allow for improved operating conditions of the bearing system or allow for changes in bearing temperature, stiffness and damping coefficients of the bearing system.

Figure 7:
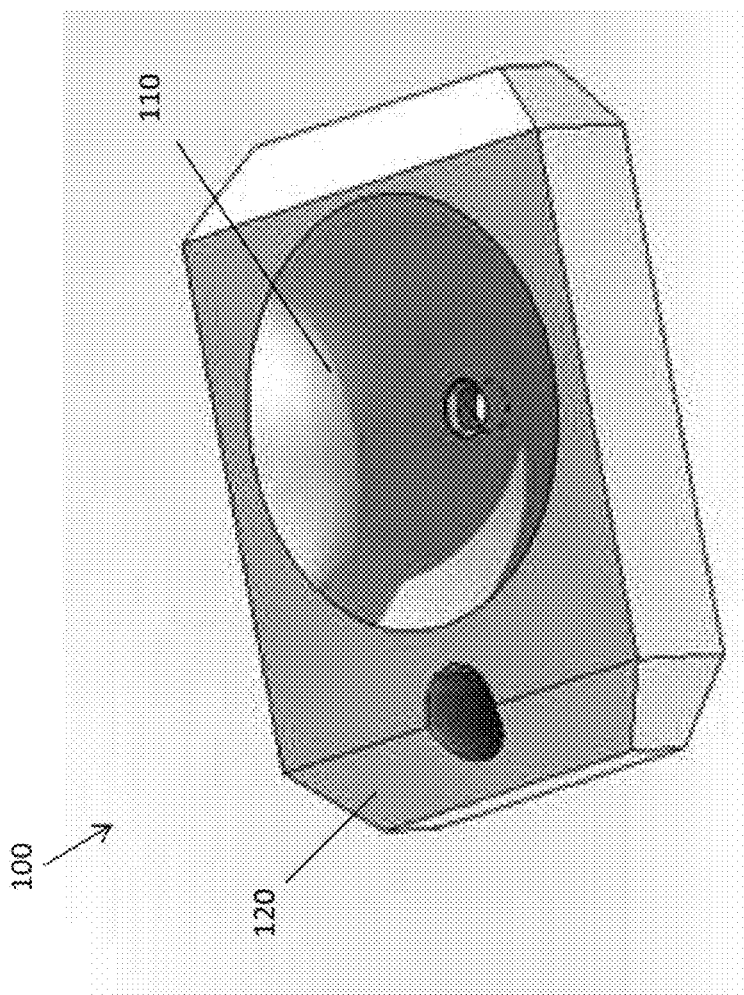
FIG. 7 illustrates a perspective view of one of many possible embodiments of an adjustable offset pad insert in accordance with certain teachings of the present disclosure.

FIG. 7 illustrates a perspective view of one of many possible embodiments of an adjustable offset pad insert 100 in accordance with certain teachings of the present disclosure. In FIG. 7, adjustable offset pad insert 100 is substantially rectangular in shape with the corners of the rectangle cut off. In other alternative embodiments, the adjustable offset pad insert 100 may be rectangular, oval or oblong shaped.

The following examples are included to demonstrate preferred embodiments of the inventions. It should be appreciated by those of skill in the art that the techniques disclosed in the examples which follow represent techniques discovered by the inventors to function well in the practice of the inventions, and thus can be considered to constitute preferred modes for its practice. However, those of skill in the art should, in light of the present disclosure, appreciate that many changes can be made in the specific embodiments which are disclosed and still obtain a like or similar result without departing from the scope of the inventions.

EXAMPLES

Example 1

As another example, if a rotating turbo machine, such as a centrifugal compressor experiences rotordynamic instability on the test stand or in operation, or hot bearing temperatures, the problem can be remedied by removing the adjustable offset pad insert in the back of the journal pads and changing the pivot offset. An adjustable offset journal pad insert can save time and money by eliminating the need to ship the journal bearings back to manufacturer, and the cost of having to purchase a back up set of journal pads. An adjustable offset in the back of the journal pad provides offset pivot adjustability so customers can make changes in the field. This is achieved by the insert. When it is installed one way one has a set pivot offset. The pivot offset can be changed by removing the adjustable offset pad insert, rotating it 180 degrees and installing back in the journal pad. This may allow for changes in bearing temperature, stiffness and damping coefficients, which may allow the machine to operate in a more stable manner or lower the bearing temperatures. An adjustable offset journal pad insert can give the original equipment manufacturer the flexibility to optimize pivot offset for best operating efficiency of the equipment.

Example 2

As a further example, if a high speed, lightly loaded machine that was experiencing pad flutter on the unloaded pads but one needs a 50% offset pivot on the loaded pads for stiffness and damping reasons, the unloaded pads could be adjusted to a 55% offset pivot to force a thicker oil wedge between the shaft and the unloaded pads settling down the pad flutter condition.

Example 3

As yet another example, if adjustments to maximize rotor dynamics are needed because, for example, during testing the results from one offset pivot did not produce the optimized results and a different offset pivot may improve the test results, the offset could be adjusted on the fly. Using the improved bearing systems and methods for adjusting pivot offsets of bearing systems disclosed herein may avoid taking the bearings out of the machine and replacing them with a new set of journal pads with a different offset, or returning the bearing to the manufacturer for the pad arc length to be shortened changing the effective journal pad offset. Adjusting the pivot offset with new pads or returning the pads for machining could be expensive in shipping and expedite charges and delay the time to get the equipment running again.

Example 4

The improved bearing systems and methods for adjusting pivot offsets of bearing systems disclosed herein may provide flexibility when revamping existing equipment for new use at higher speeds and loads. For example, if the original rotor dynamic information is not available, the ability to adjust the pivot offset provides improved flexibility and control over temperature, stiffness and damping coefficients.

Further, the various methods and embodiments of the methods of manufacture and assembly of the system, as well as location specifications, can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:

1. An apparatus for adjusting the offset of a bearing assembly, wherein the length of the apparatus is greater than the width of the apparatus which is greater than the height of the apparatus, comprising:
   a substantially flat bottom surface, wherein the substantially flat bottom surface forms the length and width of the apparatus,
   a top surface, wherein the top surface is parallel to the substantially flat bottom surface; and
   a spherical seat formed in the top surface, wherein the spherical seat is substantially centered along an axis running the length of the apparatus and offset along an axis running the width of the apparatus.

2. The apparatus of claim 1, further comprising a chamfer formed in the top surface,
   wherein the chamfer is substantially centered along the axis running the length of the apparatus, and the chamfer is formed in an edge of the top surface, wherein the edge is parallel to the axis running the width of the apparatus and is furthest from the spherical seat.

3. The apparatus of claim 2, wherein the apparatus is adapted to be inserted into a pad of the bearing assembly in a first orientation and a second orientation, wherein the first orientation is 180 degrees from the second orientation.

4. The apparatus of claim 3, wherein the apparatus is adapted to change the pivot offset of the bearing assembly from a 50% pivot offset to a 55% pivot offset.

5. The apparatus of claim 1, wherein the apparatus is adapted to be inserted into a pad of the bearing assembly in a first orientation and a second orientation, wherein the first orientation is 180 degrees from the second orientation.

6. The apparatus of claim 5, wherein the apparatus is adapted to change the pivot offset of the bearing assembly from a 55% pivot offset to a 60% pivot offset.

7. The apparatus of claim 1, wherein the apparatus is made from bronze or steel.

8. A method for adjusting a bearing assembly, the bearing assembly having a plurality of pads and an adjustable offset pad insert mounted within one of the plurality of pads, the method comprising:
   dismounting the adjustable offset pad insert from the pad;
   rotating the adjustable offset pad insert 180 degrees from its initial position; and
   mounting the adjustable offset pad insert with the pad in an orientation that is 180 degrees from its initial pre-rotation position.

9. The method of claim 8, wherein the adjustable offset pad is oblong.

10. The method of claim 8, wherein the adjustable offset pad insert comprises a spherical seat formed in a top surface, wherein the spherical seat is substantially centered along an axis running a length of the adjustable offset pad insert and offset along an axis running a width of the adjustable offset pad insert, wherein the length is longer than the width.

11. The method of claim 10, wherein the adjustable offset pad includes a relief chamfer formed in the top surface,
   wherein the top surface is opposite to the surface mounted with the pad,
   wherein the chamfer is substantially centered along the axis running the length of the adjustable offset pad insert, and the relief chamfer is formed in an edge of the top surface, wherein the edge is parallel to the axis running the width of the adjustable offset pad insert and is furthest from the spherical seat.

12. The method of claim 8, further comprising: adjusting the pivot offset.

13. The method of claim 12, wherein adjusting the pivot offset includes adjusting the pivot offset from 49-51% to a 54-56% pivot offset.

14. A bearing assembly for supporting a rotatable member, comprising:
   a bearing casing having an inner surface;
   a plurality of pads mounted to the inner surface of the bearing casing, wherein the plurality of pads each have a counterbore;
   an adjustable offset pad insert mounted with the counterbore of one of the plurality of pads, wherein the offset pad insert is oblong.

15. The bearing assembly of claim 14, wherein the adjustable offset pad insert comprises a spherical seat formed in a top surface opposite to the surface mounted with the counterbore, wherein the spherical seat is substantially centered along an axis running a length of the adjustable offset pad insert and offset along an axis running the width of the adjustable offset pad insert.

16. The bearing assembly of claim 15, wherein the adjustable offset pad insert includes a chamfer formed in the top surface of the adjustable offset pad insert,
   wherein the top surface is opposite to the surface mounted with the counterbore,
   wherein the chamfer is substantially centered along an axis running a length of the adjustable offset pad insert and the chamfer is formed in an edge of the top surface, wherein the edge is parallel to the axis running the width of the adjustable offset pad insert and is furthest from the spherical seat.

17. The bearing assembly of claim 14, wherein the adjustable offset pad insert is adapted to change the pivot offset of the bearing assembly.

18. The bearing assembly of claim 14, wherein the adjustable offset pad insert is adapted to change the pivot offset of the bearing assembly from a 50% pivot offset to a 55% pivot offset.

19. The bearing assembly of claim 14, wherein the bearing assembly comprises a journal bearing.

20. The bearing assembly of claim 14, wherein the adjustable offset pad insert is made from bronze or steel.